(12) United States Patent
Elzein et al.

(10) Patent No.: US 11,015,561 B2
(45) Date of Patent: May 25, 2021

(54) METHOD AND APPARATUS FOR VEHICLE AND MOBILE DEVICE COORDINATION

(71) Applicant: FORD GLOBAL TECHNOLOGIES, LLC, Dearborn, MI (US)

(72) Inventors: Hadi Elzein, Dearborn, MI (US); Jeffrey Raymond Ostrowski, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/785,079

(22) Filed: Apr. 27, 2020

(65) Prior Publication Data

US 2020/0248664 A1 Aug. 6, 2020

Related U.S. Application Data

(60) Continuation of application No. 15/157,767, filed on May 18, 2016, now Pat. No. 10,578,067, which is a division of application No. 14/260,382, filed on Apr. 24, 2014, now Pat. No. 9,562,506.

(51) Int. Cl.
| | |
|---|---|
| *H04M 1/725* | (2021.01) |
| *H04L 29/08* | (2006.01) |
| *H04M 1/60* | (2006.01) |
| *F02N 11/08* | (2006.01) |
| *H04W 4/48* | (2018.01) |
| *H04W 4/029* | (2018.01) |
| *G01S 19/13* | (2010.01) |
| *H04W 40/02* | (2009.01) |
| *H04W 68/02* | (2009.01) |

(Continued)

(52) U.S. Cl.
CPC .......... *F02N 11/0807* (2013.01); *G01S 19/13* (2013.01); *H04L 67/12* (2013.01); *H04M 1/6091* (2013.01); *H04M 1/7253* (2013.01); *H04W 4/029* (2018.02); *H04W 4/40* (2018.02); *H04W 4/48* (2018.02); *H04W 40/02* (2013.01); *H04W 68/02* (2013.01); *B60R 2325/101* (2013.01); *B60R 2325/202* (2013.01); *B60R 2325/205* (2013.01); *H04W 88/02* (2013.01)

(58) Field of Classification Search
CPC ..... F02N 11/0807; H04W 4/48; H04W 4/029; H04W 4/40; H04W 40/02; H04W 68/02; H04W 88/02; G01S 19/13; H04L 67/12; H04M 1/6091; H04M 1/7253; B60R 2325/101; B60R 2325/202; B60R 2325/205
See application file for complete search history.

(56) References Cited

U.S. PATENT DOCUMENTS

| | | | |
|---|---|---|---|
| 8,126,450 | B2 | 2/2012 | Howarter et al. |
| 10,578,067 | B2 * | 3/2020 | Elzein .................. G01S 19/13 |
| 2005/0237166 | A1 | 10/2005 | Chen |

(Continued)

*Primary Examiner* — Joseph E Dean, Jr.
(74) *Attorney, Agent, or Firm* — Michael Spenner; Brooks Kushman P.C.

(57) ABSTRACT

A system includes a processor configured to receive vehicle GPS coordinates. The processor is also configured to compare the received GPS coordinates to known device coordinates. Further, the processor is configured to page a vehicle computing system, requesting connection, if the vehicle coordinates and the known device coordinates are within a predetermined proximity and connect to the vehicle upon receipt of a response message from the vehicle.

20 Claims, 5 Drawing Sheets

(51) Int. Cl.
*H04W 4/40* (2018.01)
*H04W 88/02* (2009.01)

(56) References Cited

U.S. PATENT DOCUMENTS

| | | |
|---|---|---|
| 2009/0184800 A1* | 7/2009 | Harris .................... G08C 17/02 340/5.21 |
| 2010/0075656 A1 | 3/2010 | Howarter et al. |
| 2011/0117933 A1 | 5/2011 | Andersson |
| 2011/0295458 A1 | 12/2011 | Halsey-Fenderson |
| 2011/0301839 A1 | 12/2011 | Pudar et al. |
| 2014/0266594 A1 | 9/2014 | Reiser |

* cited by examiner

METHOD AND APPARATUS FOR VEHICLE AND MOBILE DEVICE COORDINATION

CROSS-REFERENCE TO RELATED APPLICATIONS

This application is a continuation of U.S. application Ser. No. 15/157,767 filed on May 18, 2016, now U.S. Pat. No. 10,578,067, issued Mar. 3, 2020, which is a divisional of U.S. application Ser. No. 14/260,382, filed Apr. 24, 2014, now U.S. Pat. No. 9,562,506, which application is hereby incorporated by reference in its entirety.

TECHNICAL FIELD

The illustrative embodiments generally relate to a method and apparatus for vehicle and mobile device coordination.

BACKGROUND

Vehicles frequently come equipped with telematics systems capable of remote communication with cloud-based resources and other service providers. In some instances, these systems use occupant mobile devices in order to communicate with the remote systems. The devices can serve the additional purpose of identifying the device owner for the vehicle, which can be useful in providing tailored connected services. Typically the devices will communicate with the vehicle, but not with each other. Often, the vehicle may only be connected to a single device at a time, to utilize the resources of that device to provide connective services.

A device typically is made aware of proximity to a vehicle when the vehicle pages the device. This frequently occurs after the vehicle has been powered. So as to preserve power, the vehicle typically does not send out constant paging, waiting for a known device to come into reception proximity. While this does serve to preserve power, it also means that the device is not connected to the vehicle until the owner is already in the vehicle. This arrangement may make it difficult for the owner to exercise any control over the vehicle via the device, before entering the vehicle, if such control is desired.

U.S. Application Publication No. 2005/0237166 generally relates to a vehicle anti-thief device that includes an on-vehicle main unit, an on-vehicle bluetooth module, and a bluetooth mobile terminal to be carried by the user. When the user leaves the car, the on-vehicle bluetooth module receives no signal from the bluetooth mobile terminal and then drives the on-vehicle main unit into alarm mode. When the user with the bluetooth mobile terminal enters the communication radius of the bluetooth module, the bluetooth mobile terminal connects the on-vehicle bluetooth module wirelessly and gives a disarm signal to disarm alarm setting of the on-vehicle main unit.

U.S. Pat. No. 8,126,450 generally relates to a system and method for unlocking a vehicle with a cell phone. Wireless signals are monitored from a cell phone. A signal is received from the cell phone. A distance between the cell phone and the vehicle is determined. Doors of the vehicle are unlocked in response to the cell phone nearing the vehicle. The doors of the vehicle are locked in response to the cell phone being further separated from the vehicle.

SUMMARY

In a first illustrative example, a system includes a processor configured to receive vehicle GPS coordinates. The processor is also configured to compare the received GPS coordinates to known device coordinates. Further, the processor is configured to page a vehicle computing system, requesting connection, if the vehicle coordinates and the known device coordinates are within a predetermined proximity and connect to the vehicle upon receipt of a response message from the vehicle.

In a second illustrative embodiment, a system includes a processor configured to receive a request to start a vehicle. The processor is also configured to determine if a connected phone is present within the vehicle and start the vehicle upon determination that a connected phone is present within the vehicle.

In a third illustrative embodiment, a system includes a processor configured to receive a request from a plurality of phones to connect to a single vehicle connection. The processor is also configured to retrieve an order ranking of the phones, placing at least one of the phones higher than another. Further, the processor is configured to attempt to connect to a highest ranked phone first. The processor is additionally configured to continue connection attempts with lower ranked phones, when connection attempts with higher ranked phones fail and establish connection with a phone upon success of a connection attempt.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
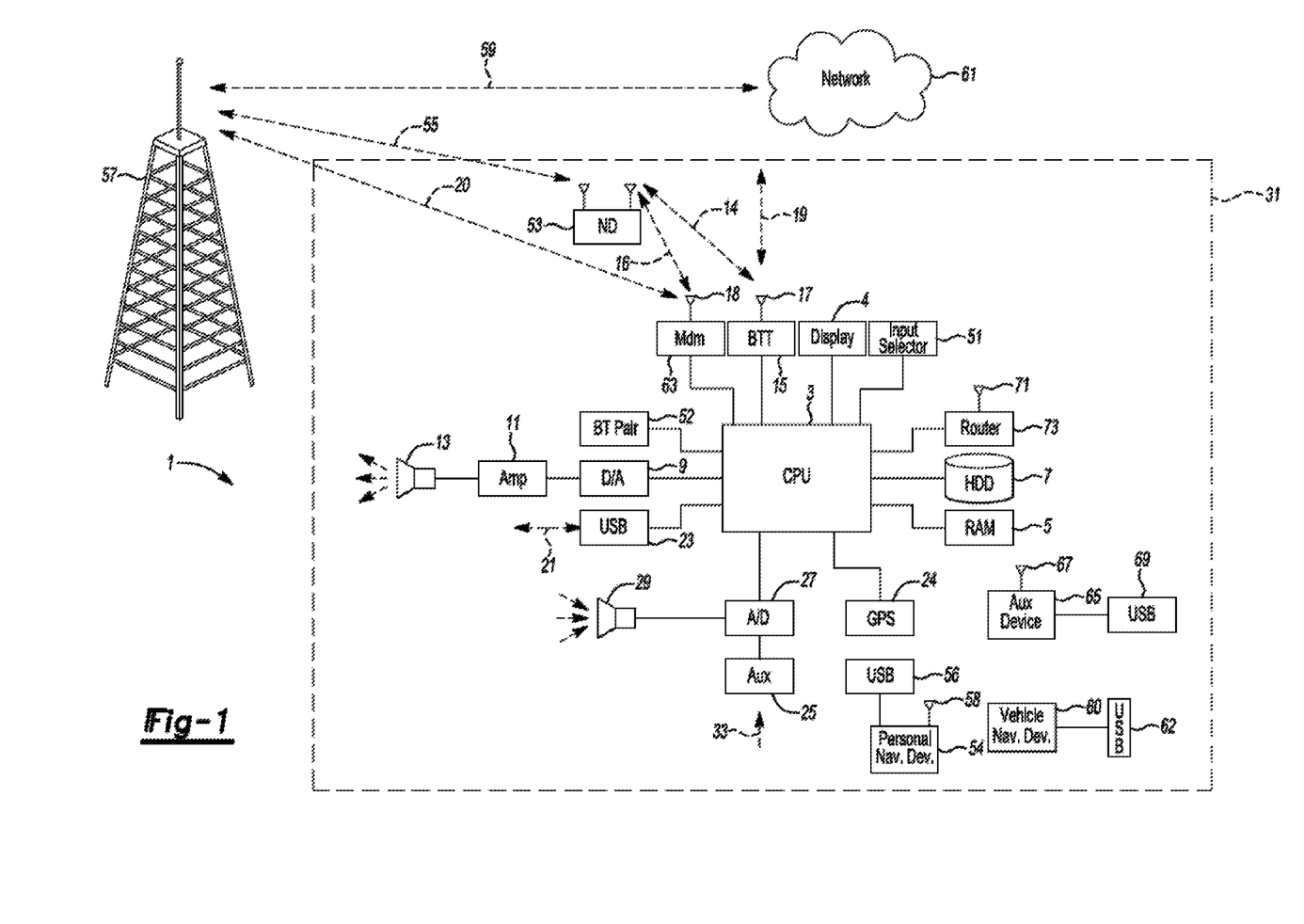
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a universal serial bus (USB) input 23, a global positioning system (GPS) input 24 and a BLU-ETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a controller area network (CAN) bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLU-ETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, personal digital assistant (PDA), or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the central processing unit (CPU) is instructed that the onboard BLUETOOTH transceiver will be paired with a BLUETOOTH transceiver in a nomadic device.

Data may be communicated between CPU 3 and network 61 utilizing, for example, a data-plan, data over voice, or dual-tone multi-frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

Mobile devices have the characteristic of commonly being associated with only a single individual. As such, they are often very useful in identifying the presence of the device-owning individual. So, for example, if a device is detected, the presence of the device generally indicates the presence of the individual who owns the device.

When used in combination with a vehicle-based telematics system, the illustrative embodiments provide examples of how the presence of an authorized driver can be detected visa vie the presence of a known device. This can be useful in preventing theft of the vehicle, since unauthorized drivers will not be likely to possess the mobile device of an authorized driver.

Additionally, situations often arise where a number of known devices are proximate to a vehicle (such as in a house, wherein the vehicle is garaged). In such a case, when the vehicle is started, the devices may all be recognized by the vehicle as being within a communication proximity of a short range communication protocol (e.g., BLUETOOTH). The system may attempt to pair with one or more devices not actually present in the vehicle, resulting in errors and/or confusion when the vehicle moves out of connected proximity of the device. The illustrative embodiments further provide for examples of how a vehicle can more specifically select and/or connect to devices that are actually within the vehicle.

Figure 2:
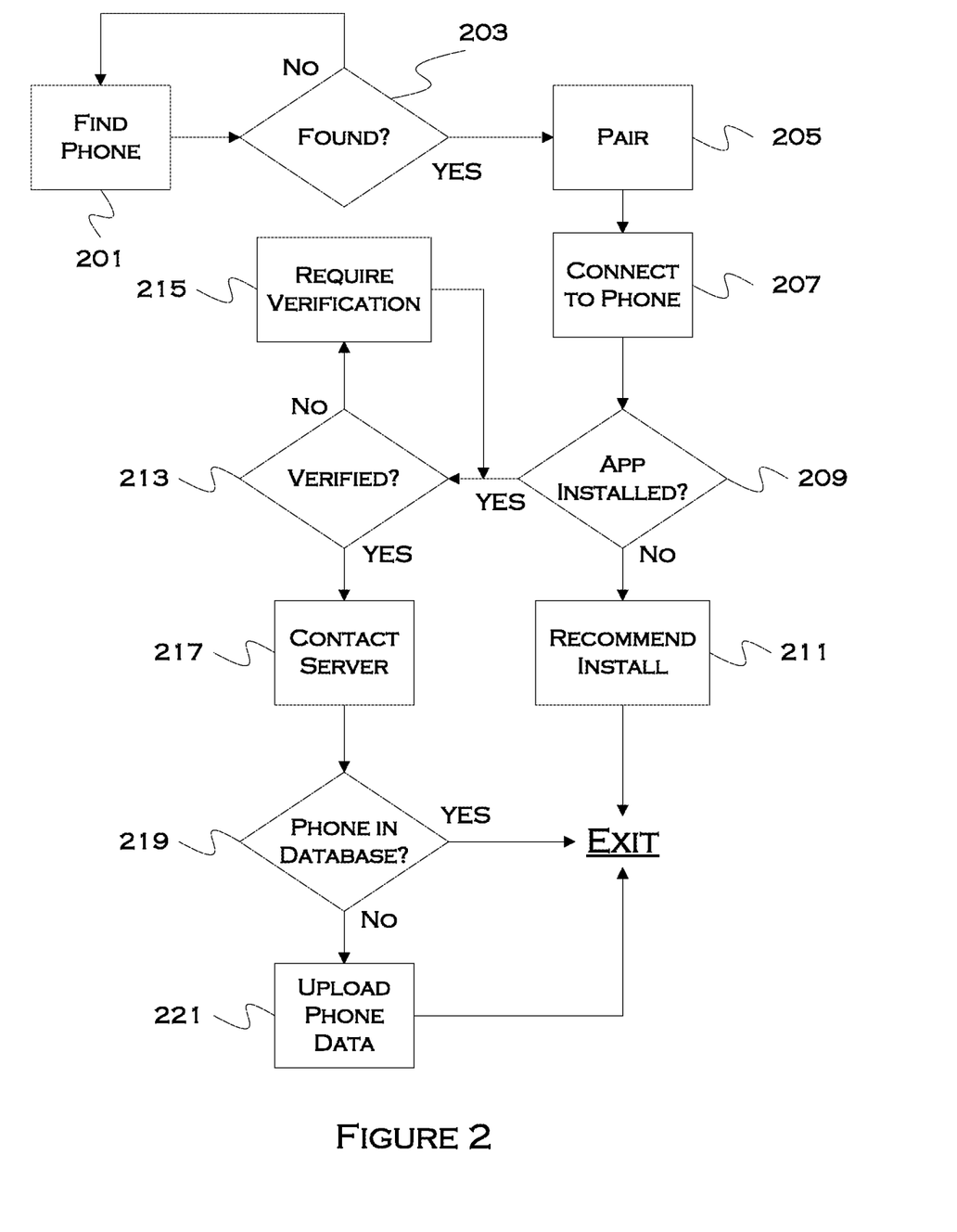
FIG. 2 shows an illustrative process for registering a mobile device.

FIG. 2 shows an illustrative process for registering a mobile device. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process running in a vehicle computer seeks out one or more unpaired/unregistered devices 201. This can include new phones, new users, new devices such as tablets, etc. If a new device is found 203, the process attempts to pair with the device 205. The pairing typically, although not necessarily, comes at the request of a user. For example, the vehicle computer may identify a number of possible phones for pairing, and the user can select one or more identified devices.

Once the device is paired, the process may connect to the phone 207, in order to communicate with the phone. Communication with the phone can include, for example, retrieval of address book information, retrieval of user identity, retrieval of user calendar, retrieval of apps installed on the phone, etc. In this example, the process checks to see if a phone locator application is installed 209. In the illustrative embodiments, in at least one example, an automotive original equipment manufacturer (OEM) provides an application for installation on a phone.

If the application is not installed on the phone 209, the process will recommend installation of the application 211. Until the application, in this example, is installed, the process will not register the phone remotely as a phone which can be used to practice other of the illustrative embodiments and their like.

Once the application is installed 209, the process may check to see if the user has verified this phone as a permissible phone 213. This is done to prevent a thief from pairing a phone with the application installed, and then using the phone to enable the vehicle. The authorization can come in many forms, such as, but not limited to, authorization through an identified primary phone, authentication through a web portal, input of a password or authentication code, etc. If the phone has not been verified, the process will request verification 215.

Once the phone is verified, the process will contact a remote server, in this example. The process will contact the server and upload some identifying information about the phone, this information can be used to communicate with the application in later instances, such as those shown by example in the illustrative embodiments.

Once in communication with the server, the process may check to see if the phone is already in a server database. If the phone is not in the database 219, the process will upload the needed data to communicate with the phone and to track its location. If the phone is already in the database, the process exits.

Figure 3A:
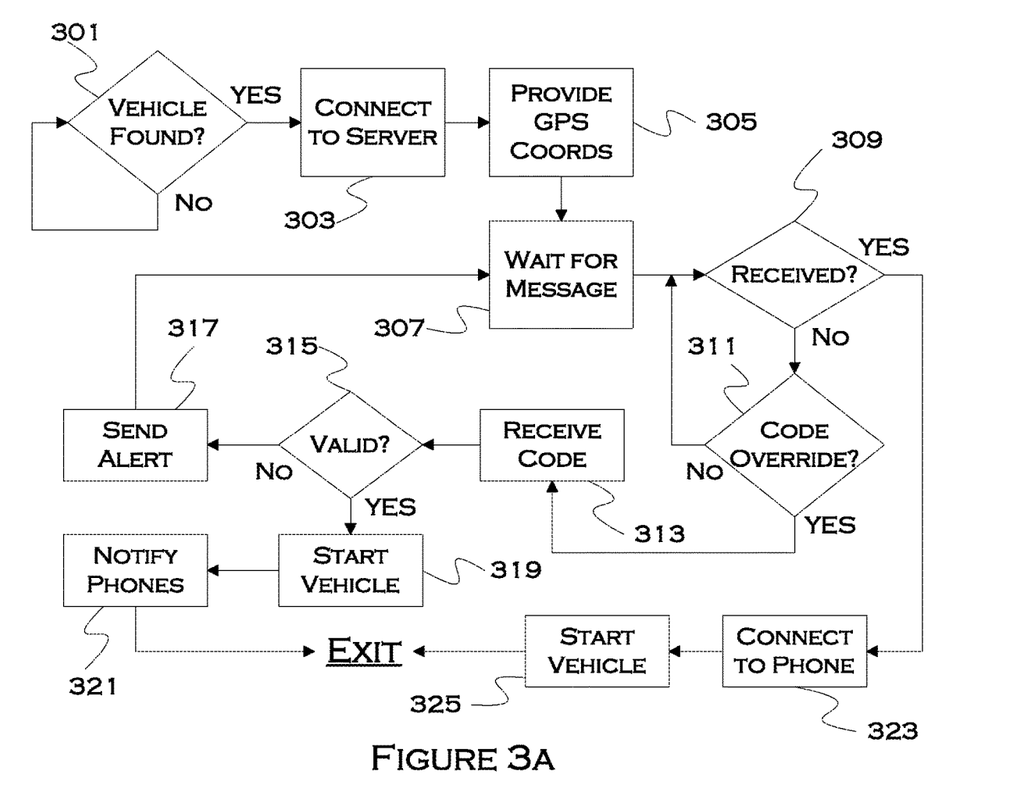
FIGS. 3A-3C show illustrative examples of vehicle startup processes.
Figure 3B:
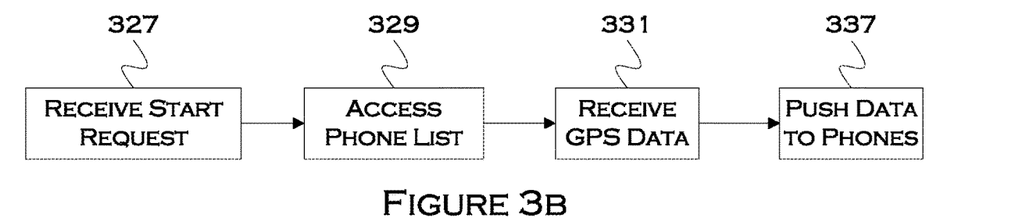
Figure 3C:
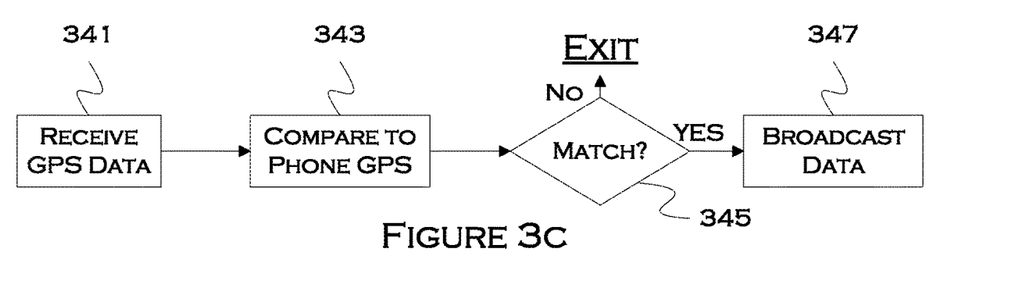

FIGS. 3A-3C show illustrative examples of vehicle startup processes. With respect to the illustrative embodiments described in these figures, it is noted that a general purpose processor may be temporarily enabled as a special purpose processor for the purpose of executing some or all of the exemplary methods shown herein. When executing code providing instructions to perform some or all steps of the methods, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the methods or some reasonable variation thereof.

In this illustrative example, FIG. 3A shows an illustrative process for preventing vehicle startup in the absence of a connected device. Since a device may die, lose power, lose connection, be lost or be forgotten, there is also an override code possible in this example, for an authorized user to use in case the device is not present but the vehicle is not being stolen.

In this illustrative example, the vehicle, at some point, attempts to determine its own GPS coordinates 301. While these may typically be available, in some instances the vehicle may not be able to "find itself." For example, if the vehicle is in an underground garage. Once the vehicle has coordinates identified, the process connects to a remote server 303 and provides the GPS coordinates to the remote server 305.

Once the coordinates have been provided, the process waits for a message from a phone, indicating that the phone is in proximity to a vehicle 307. This message can come directly from the phone, or can be an indication from a server that a phone is in proximity. The system will typically engage in the exemplary process shown herein when a vehicle startup attempt is made, to check for the presence of a phone in the vehicle.

If no message is received 309, the process may offer an opportunity to input an override code 311. If there is no override code, the process will continue to check for a message from the phone/server.

If the user is using an override code, the process will receive a code input by the user (on an in-vehicle display, for example) 313. The code could also be an audio code, or input through a series of vehicle controls, etc. If the code is not valid 315, the process can send an alert to both the server and (directly or through the server, for example) to all the authorized phones, or to one or more designated phones 317.

If the code is valid, the process will start the vehicle 319. In this example, the process still alerts the phone(s) that a code was used to start the vehicle 321, in case the code is being used by one or more unauthorized parties.

If the message is received by the vehicle, the vehicle will connect to the phone from which the message originated 323, since this is the phone that is providing the authentication rights. Once connected to the phone, the process will start the vehicle 325.

FIG. 3B shows an example of a process for vehicle startup and GPS coordinate sharing. In this example, the process receives a start request from a user in the vehicle 327. Once received, the vehicle will identify its GPS coordinates to the phone. The phone will, if appropriate, response to this sharing.

The vehicle process accesses a list of phones with which coordinates should be shared 329. This list could also be stored on a server. Vehicle GPS data is then received 331 and sent to a server for sharing or pushed directly to the phones 337.

FIG. 3C shows an illustrative process for a phone handshaking with a vehicle once vehicle GPS data is received. In this example, the phone(s) receive vehicle GPS data identifying a location of the vehicle 341. The vehicle GPS data is compared to phone GPS data 343, to determine if the phone is in the same location as the vehicle.

If there is a match, indicating the phone is in or very near to the vehicle 345, the process will broadcast a message from the phone (e.g., "Phone XXXX is present). Otherwise, the process will exit, with no data being broadcast, since the phone is not near the vehicle.

Figure 4:
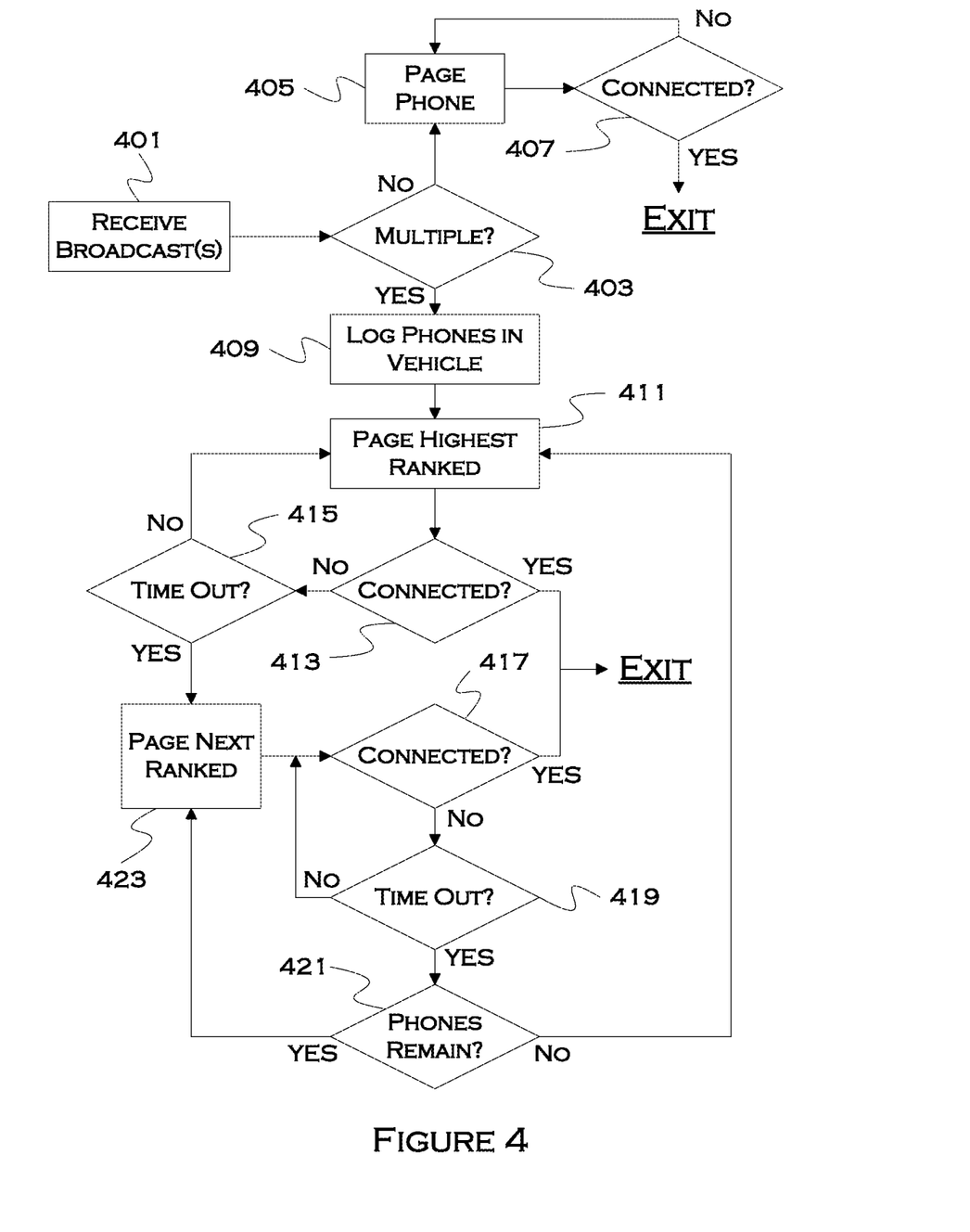
FIG. 4 shows an illustrative example of an ordered communication process for in-vehicle devices.

FIG. 4 shows an illustrative example of an ordered communication process for in-vehicle devices. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process will attempt to communicate with one or more phones that are in or nearby the vehicle. Since multiple phones may be in the vehicle, the process may have some predetermined order in which the phones are to be connected. In this example, the process may receive identification broadcasts from a plurality of phones.

Once one or more broadcasts have been received 401, the process determines whether or not multiple phones broadcasted their identity 403. If only a single phone identified itself, the process will page the phone 405 to connect to that phone. If the phone is not connected, the paging will continue. Once the phone connects, since there is only a single phone, the process exits 407.

If multiple broadcasts were received, the process will make a record of all phones in the vehicle 409. In this example, the phones are identified based on the process having received a page from those phones. Also, in this example, when a phone is connected the user has ranked the phone. This could be, for example, designating a primary and secondary phones, or even ranking each individual phone in some order. Once the phones have been logged, the process pages the highest ranked phone first 411. If the phones have no distinction, or are ranked the same, the process will make a decision as to an order in which to page the phones.

Once a phone has been paged, the process will check to see if a connection is established 413. If no connection is established, the process may have some period of time during which the connection is still attempted. If there is a timeout (e.g., the time period expires), the process will move to a next ranked phone (or other next phone) 423 and attempt to connect to this phone 417. Again, a timeout may be employed to provide some time period for a phone to connect 419.

In this example, if a second phone also fails to connect, the process will check to see if any additional phones remain. If phones remain 421, the process will continue to check for those phones and page further next phones. Otherwise, the process will loop and retry from the start of the list.

Figure 5A:
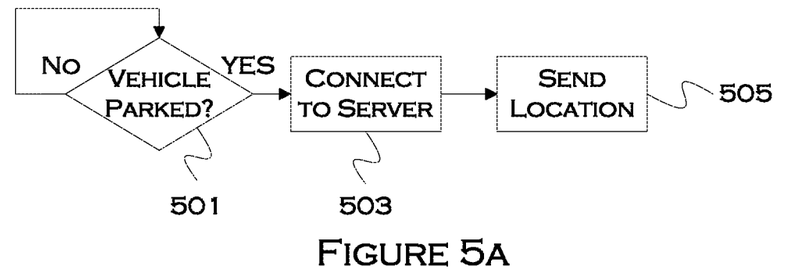
FIGS. 5A and 5B show illustrative examples of ordered device originated vehicle paging.
Figure 5B:
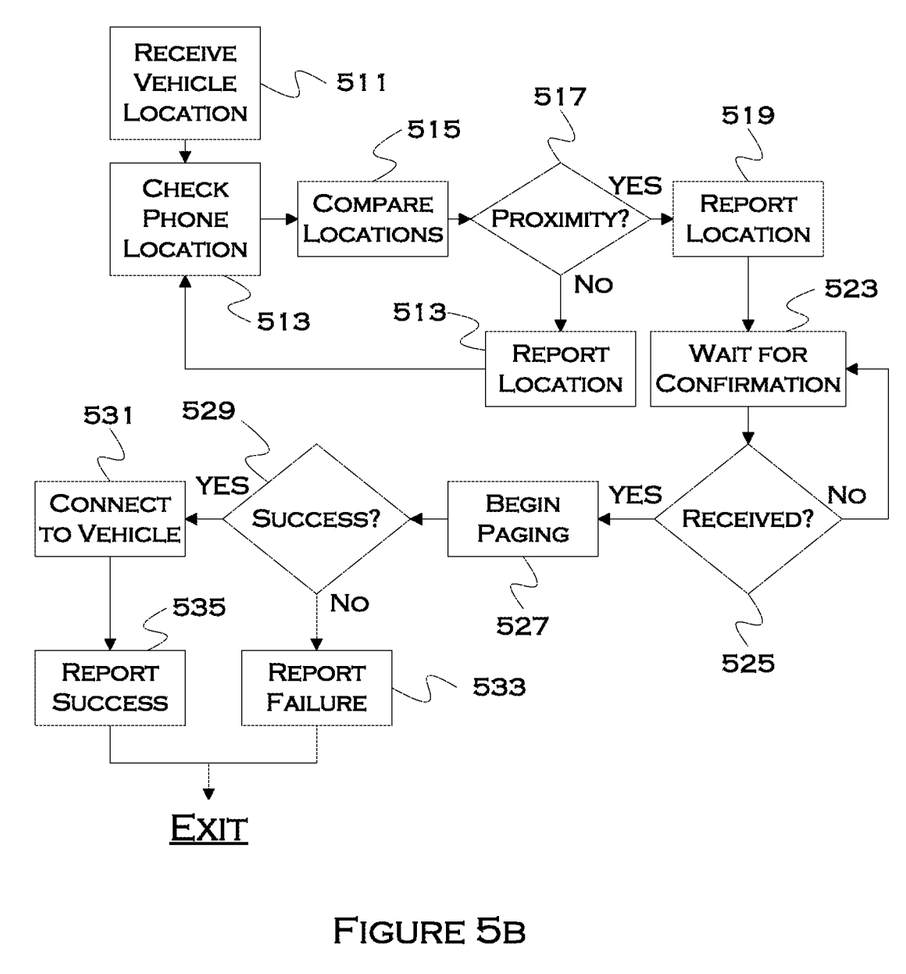

FIGS. 5A and 5B show illustrative examples of ordered device originated vehicle paging. With respect to the illustrative embodiments described in these figures, it is noted that a general purpose processor may be temporarily enabled as a special purpose processor for the purpose of executing some or all of the exemplary methods shown herein. When executing code providing instructions to perform some or all steps of the methods, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the methods or some reasonable variation thereof.

FIG. 5A shows a reporting process for a vehicle that is being parked at a location. This allows the GPS vehicle location to hopefully be saved when the vehicle is parked. In this example, once the vehicle is parked 501, the process will connect to a remote server 503.

Once the connection to the server has been established, the process will report the known GPS coordinates of the vehicle 505. If the vehicle GPS coordinates are unknown, dead reckoning may be used to guess the coordinates, or no coordinates may be reported.

FIG. 5B shows an illustrative example of one or more phones in proximity to a parked vehicle paging the vehicle to "wake up" the vehicle and to identify the phones to the vehicle. In this illustrative example, the phone(s) receives the vehicle location from a remote server 511. This location could have been reported, for example, when the vehicle was parked.

Once each phone on the approved list has received the vehicle coordinates, they can be saved and used until the vehicle moves. The application on the phone checks a phone location, identified by GPS coordinates, against the vehicle coordinates 513. The comparison between coordinates is made 515, and if the phone is within a predetermined proximity of the vehicle 517, the phone will report its location to the vehicle 519. This reporting can be done, for example, using low energy BLUETOOTH or another suitable wireless protocol.

If the phone is not proximate to the vehicle, the phone may report its coordinates to the remote server 513. These coordinates can be used to determine if, for example, any phones are in relative proximity to the vehicle.

If any phone has identified itself to the vehicle, the phone will wait for confirmation from the vehicle that the message has been received 523. If no confirmation is received, the process will continue to wait. Otherwise, once confirmation has been received 525, the process will begin paging the vehicle 527 to connect. For example, if a phone is within 20 feet of a vehicle, it may identify itself to the vehicle. But, until the phone is actually in the vehicle, it cannot be used to start the vehicle in this example. So if the phone is moving away from the vehicle or never enters the vehicle, the vehicle cannot be driven on the basis of this phone.

If the paging results in a success 529, indicating the phone is in communication with the vehicle, the vehicle will connect to the phone 531 and the phone will report to the server that the vehicle has connected to the phone 535. Otherwise, the process will report that the phone was unable to connect 533. Once a phone is connected, other phones may be instructed to stop paging the vehicle, so that more than one phone does not attempt to connect to the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
   detecting a handshake request from a wireless phone;
   connecting to the wireless phone;
   receiving phone coordinates via a connection established by the connecting; and
   starting a vehicle, responsive to an onboard start request, following a determination that the phone is present within the vehicle based on the phone coordinates received from the wireless phone corresponding to vehicle coordinates.

2. The method of claim 1, wherein the connecting is responsive to receiving a message that the phone is proximate to the vehicle.

3. The method of claim 2, wherein the message is received from the phone as part of the handshake request, based on the vehicle coordinates known to the phone having a predefined relationship to the phone coordinates.

4. The method of claim 2, wherein the message is received from a remote server, subsequent to the handshake request and based on the phone coordinates and the vehicle coordinates known to the remote server.

5. The method of claim 1, further comprising determining that the phone was previously authorized for use in vehicle startup.

6. The method of claim 5, wherein the determining that the phone was previously authorized includes determining that the phone has a vehicle-stored prior authorization from a primary phone for the secondary phone to be used to control the vehicle.

7. The method of claim 1, further comprising:
   receiving the vehicle coordinates at the wireless phone, from a remote server, after the vehicle has been parked; and
   sending the handshake request responsive to the vehicle coordinates have a predefined relationship to the phone coordinates.

8. The method of claim 1, further comprising:
   receiving an instruction, at the phone, from a remote server, instructing handshaking with an identified vehicle; and
   sending the handshake request to the identified vehicle, responsive to the instruction.

9. The method of claim 8, further comprising:
   receiving the vehicle coordinates at the remote server after the vehicle has been parked;
   receiving the phone coordinates from the phone; and
   sending the instruction to handshake with the identified vehicle to the phone responsive to the phone coordinates having a predefined relationship to the vehicle coordinates, the instruction identifying the vehicle, from which the vehicle coordinates were received, as the identified vehicle.

10. A system comprising:
    a vehicle; and
    a vehicle processor configured to:
    detect a handshake request from a wireless phone;
    connect to the wireless phone;
    receive phone coordinates via a connection established by the connecting; and
    start a vehicle, responsive to an onboard start request, following a determination that the phone is present within the vehicle based on the phone coordinates received from the wireless phone corresponding to vehicle coordinates.

11. The system of claim 10, wherein the connecting is responsive to receiving a message that the phone is proximate to the vehicle.

12. The system of claim 11, wherein the message is received from the phone as part of the handshake request, based on the vehicle coordinates known to the phone having a predefined relationship to the phone coordinates.

13. The system of claim 11, wherein the message is received from a remote server, subsequent to the handshake request and based on the phone coordinates and the vehicle coordinates known to the remote server.

14. The system of claim 10, wherein the processor is further configured to determine that the phone was previously authorized for use in vehicle startup.

15. The system of claim 14, wherein the determination that the phone was previously authorized includes a determination that the phone has a vehicle-stored prior authorization from a primary phone for the secondary phone to be used to control the vehicle.

16. The system of claim 10, further comprising:
the phone; and
a phone processor configured to:
receive the vehicle coordinates at the phone, from a remote server, after the vehicle has been parked; and
send the handshake request responsive to the vehicle coordinates have a predefined relationship to the phone coordinates.

17. The system of claim 10, further comprising:
the phone; and
a phone processor configured to:
receive an instruction, at the phone, from a remote server, instructing handshaking with an identified vehicle; and
send the handshake request to the identified vehicle, responsive to the instruction.

18. The system of claim 17, further comprising:
the remote server, including a processor configured to:
receive the vehicle coordinates at the remote server after the vehicle has been parked;
receive the phone coordinates from the phone; and
send the instruction to handshake with the identified vehicle to the phone responsive to the phone coordinates having a predefined relationship to the vehicle coordinates, the instruction identifying the vehicle, from which the vehicle coordinates were received, as the identified vehicle.

19. A non-transitory computer-readable storage medium, storing instructions that, when executed by a vehicle processor, cause the processor to perform a method comprising:
detecting a handshake request from a wireless phone;
connecting to the wireless phone;
receiving phone coordinates via a connection established by the connecting; and
starting a vehicle, responsive to an onboard start request, following a determination that the phone is present within the vehicle based on the phone coordinates received from the wireless phone corresponding to vehicle coordinates.

20. The storage medium of claim 19, wherein the method further includes determining that the phone was previously authorized based on vehicle-stored prior authorization from a primary phone for the secondary phone to be used to control the vehicle, and wherein the starting a vehicle is further responsive to determining that the phone was previously authorized.

* * * * *